Aug. 24, 1965 R. H. ALLMARK 3,202,839

ELECTRIC VOLTAGE COMPARISON MEANS

Filed Oct. 18, 1962 4 Sheets-Sheet 1

Inventor:
Reginald Hugh Allmark
By Stevens, Davis, Miller & Mosher
Attorneys

Inventor:
Reginald Hugh Allmark
By: Stevens, Davis, Miller & Mosher
Attorneys

Aug. 24, 1965 R. H. ALLMARK 3,202,839

ELECTRIC VOLTAGE COMPARISON MEANS

Filed Oct. 18, 1962 4 Sheets-Sheet 3

Inventor:
Reginald Hugh Allmark
By: Martin E. Hogan, Jr.
Attorney

Aug. 24, 1965 R. H. ALLMARK 3,202,839

ELECTRIC VOLTAGE COMPARISON MEANS

Filed Oct. 18, 1962 4 Sheets-Sheet 4

Inventor:
Reginald Hugh Allmark
By: Martin E. Hogan, Jr
Attorney 3,202,839
Patented Aug. 24, 1965

3,202,839
ELECTRIC VOLTAGE COMPARISON MEANS

Reginald Hugh Allmark, Stoke-on-Trent, England, assignor to The English Electric Company Limited, London, England, a British company Filed Oct. 18, 1962, Ser. No. 231,341
Claims priority, application Great Britain, Oct. 20, 1961, 37,791/61
22 Claims. (Cl. 307—88.5)

Figure 1:
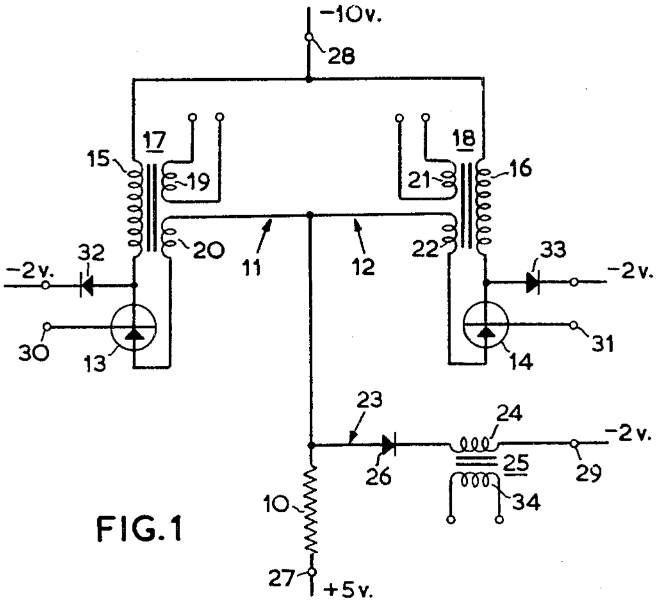

This invention relates to means for comparing two voltage signals whereby to determine at any given instant which of the two signals has the greater magnitude, and to electric apparatus incorporating such voltage comparison means.

According to the present invention an electric voltage comparison means includes two similar transistors having their emitter-collector circuits connected in parallel with one another and sharing a common emitter circuit load resistor, each transistor having associated therewith a positive feedback means for feeding back energy from its collector circuit to its emitter circuit in a sense tending to accelerate any change in its collector current, and each of the two feedback means having an output circuit for providing an output signal when the collector circuit current of the associated transistor changes in value, input circuit means for applying two D.C. voltage signals for comparison to the two base-emitter circuits respectively of the transistors, and an auxiliary circuit for connecting the junction of the common emitter load resistor and the two emitter circuits of the transistors with a source of bias potential and including a voltage pulse producing means for momentarily varying the potential of this junction in a step-like manner whereby to cause the transistor having a base potential nearer the bias potential of the bias source to change rapidly between its non-conductive and conductive states when energised from an appropriate D.C. voltage supply source.

According to another feature of the present invention a means for detecting the presence or absence of an input voltage pulse in an input train of pulses comprises such an electric voltage comparison means, a bistable electric device for producing true and complement output signals in response to appropriate signals applied to set and reset input circuits respectively by the respective output circuits of the feedback means, means for applying the input voltage pulse train to the base-emitter circuit of one of the said two transistors, means for biasing the base-emitter circuit of the other of the two transistors to a potential of magnitude less than that of the said input voltage pulses, and means responsive to the said input pulse train for causing the said voltage pulse producing means to induce pulses in the auxiliary circuit which are delayed by a predetermined amount relative to the said input pulses.

According to another feature of the present invention a means for checking the electrical performance of transistors comprises such an aforesaid comparison means, a bistable electric device for producing true and complement output signals in response to appropriate signals applied to set and reset input circuits respectively by the respective output circuits of the two feedback means, a second pulse generating means for causing current pulses to flow in the emitter-collector circuit of a transistor under test, adjustable means for controlling the flow of base current in the transistor under test, means for applying the emitter-collector potential difference of the transistor under test to the base-emitter circuit of one of the two transistors, adjustable bias means for providing an adjustable base-emitter potential for the other of the two transistors, and an adjustable delay means responsive to the output pulses of the second pulse generating means for causing the first-mentioned voltage pulse producing means to induce pulses in the auxiliary circuit which are delayed by an adjustable amount relative to the input voltage pulses applied to the emitter-collector circuit of the transistor under test.

Each feedback means may comprise a transformer having a primary winding connected in the collector circuit of the associated transistor, a secondary winding connected in the emitter circuit of the associated transistor, and a tertiary winding constituting said output circuit for providing an output signal when the collector circuit current of the associated transistor changes in value.

The following text describes by way of example and with reference to the accompanying drawings one voltage comparison means according to the present invention, and three different electrical apparatuses which incorporate such a voltage comparison means.

Figure 2:
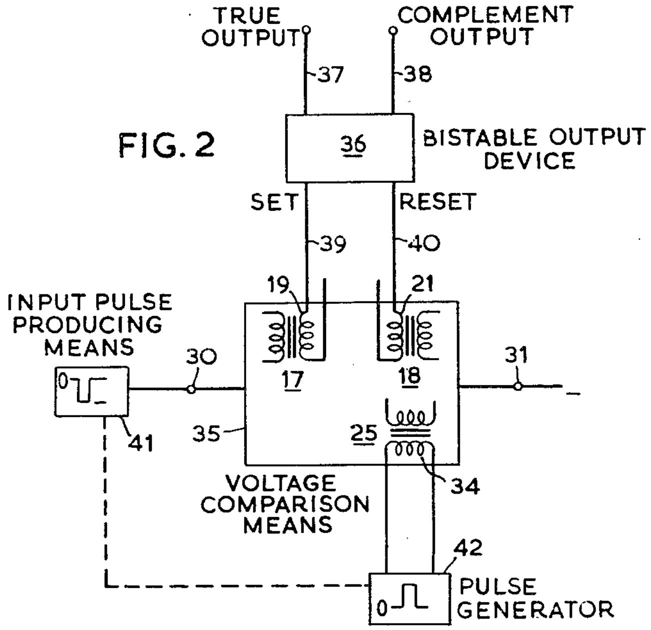
Figure 3:
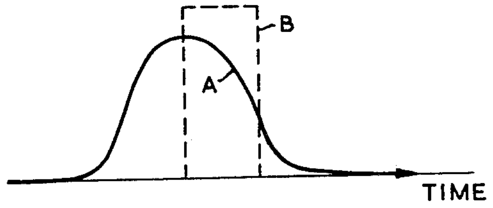
Figure 4:
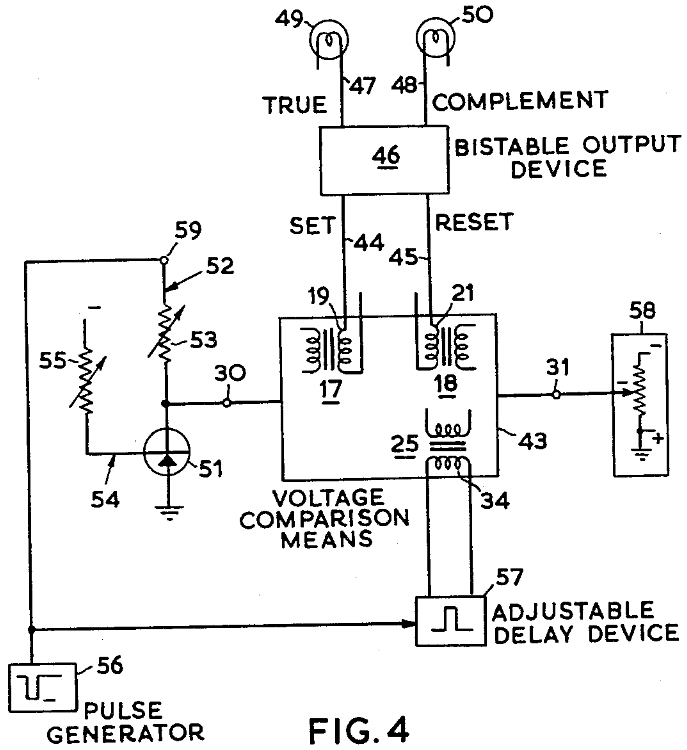
Figure 5:
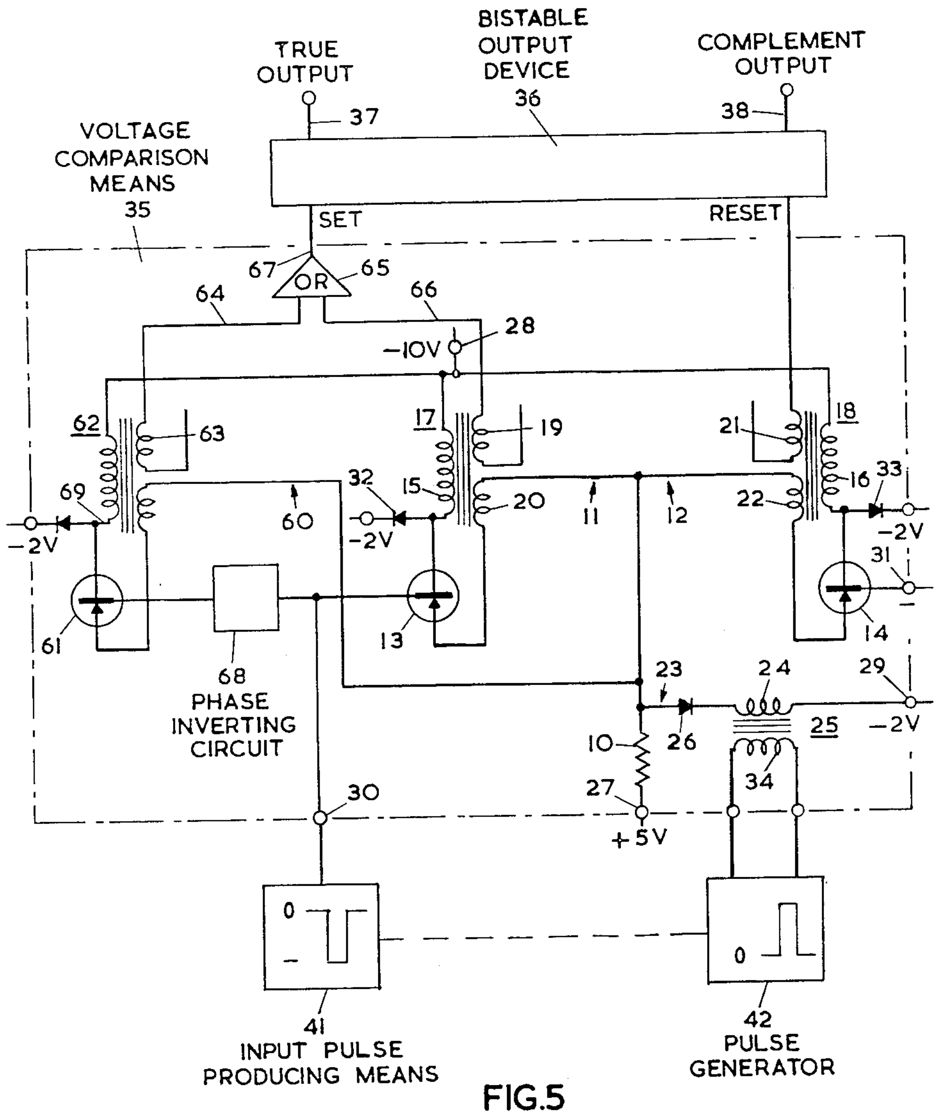
Figure 6:
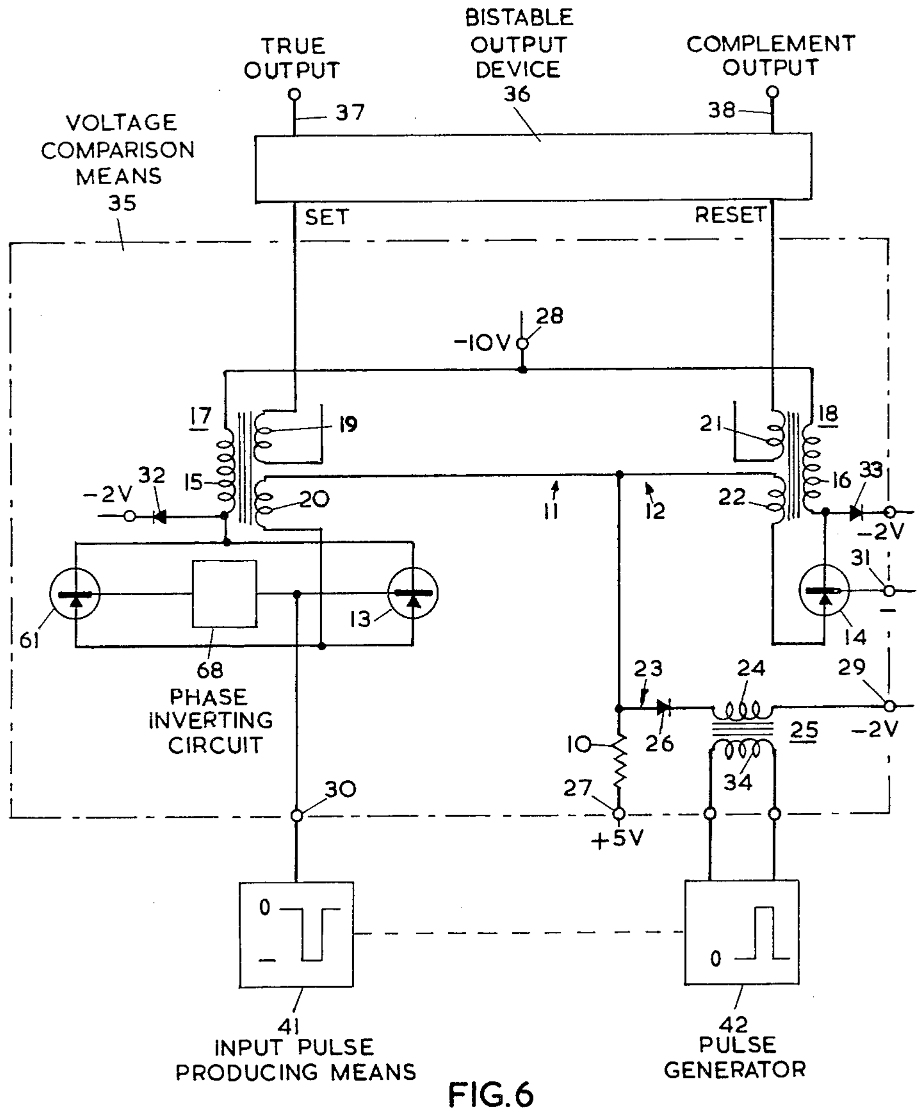

In the drawings FIGURE 1 shows a circuit diagram of the voltage comparison means; FIGURE 2 shows a circuit diagram of an electric apparatus for producing a first or second electric output signal dependent upon the presence or absence at any given instant of an input voltage pulse; FIGURE 3 shows the time relationship of two pulses in an electric apparatus for reading out the contents of a ferrite core store; FIGURE 4 shows a circuit diagram of an electric apparatus for determining the value of the saturation current gain of a transistor; and FIGURES 5 and 6 show circuit diagrams of alternative modified forms of the electric apparatus shown in the FIGURE 2.

Referring now to FIGURE 1 the voltage comparison means includes two similar p-n-p type transistors 13, 14 which have their emitter-collector circuits 11, 12 connected in parallel with one another and which share a common emitter load resistor 10. Associated with the two transistors are positive feedback transformers 17, 18 respectively for feeding back energy from the collector circuits to the emitter circuits of the two transistors in a sense tending to accelerate any change in the collector currents of the transistors. The feedback transformers include, in addition to primary windings 15, 16 connected in the collector circuits of the transistors and secondary windings 20, 22 connected in the emitter circuits, tertiary or output windings 19 and 21 for providing output voltage signals when the collector currents of the transistors are changing in value.

An auxiliary circuit 23 connected at one end with the junction of the emitter load resistor 10 and the parallel emitter-collector circuits 11 and 12 includes a secondary winding 24 of a pulse transformer 25 and a diode 26, the latter being connected adjacent the said junction and in a sense such as to prevent the flow of current from the auxiliary circuit into the said junction.

To cause the circuit to function in the desired manner a terminal 27 adjacent the resistor 10 is connected to a +5 volts tapping of a D.C. supply source, a terminal 28 adjacent the opposite end of the emitter-collector circuits is connected to a —10 volts tapping of the supply source, an a terminal 29 of the auxiliary circuit 23 is connected to a —2 volts tapping of the supply source. The negative potential to be applied to this terminal 29 is selected so as to just exceed the magnitude of the voltages to be compared, these latter voltages being applied in a negative sense to base circuit terminals 30 and 31 of the transistors.

In order to limit the voltages appearing across the primary windings of the feedback transformers the collectors of the transistors are connected through diodes 32 and 33 to the said —2 volts tapping of the supply source.

In operation when no signal is applied to the primary winding 34 of the pulse transformer 25 a current flows between the terminals 27 and 29 through the resistor 10 and the auxiliary circuit 23. Under this condition the voltage drop in the auxiliary circuit 23 is very small so that the emitters of the two transistors are very close in potential to that of the −2 volts tapping, and are therefore at potentials which are negative with respect to those of the transistor base circuits. Since the base circuits of the transistors are thus positive in potential with respect to the respective emitters no current flows in either of the parallel circuits 11 or 12, and no output voltage appears at the terminals of either of the tertiary windings 19 and 21 of the feedback transformers.

To determine which of the voltages for the time being applied to the base circuit terminals 30 and 31 is the greater, a voltage pulse is applied to the primary winding 34 of the pulse transformer 25 in a sense tending to reduce the flow of current in the auxiliary circuit and hence to increase the potential of the junction of the auxiliary circuit with the parallel circuits whereby to increase the potential applied to the emitters of the transistors.

Immediately this emitter potential rises above the potential of the base circuit carrying the greater negative potential, base and collector currents begin to flow in that transistor; and the flow of these curents through the emitter load resistor 10 prevents any further increase in the potential of the said junction. The diode 26 is subsequently rendered non-conducting by the voltage pulse developed in the secondary winding 24 of the pulse transformer when the potential of the cathode of the diode is driven more positive than the potential at which the anode of the diode is now held. Since the positive change in the potential of the said junction ceases as soon as the transistor with the more negative base potential begins to conduct, the tendency for the other transistor to conduct is greatly reduced. This other transistor is further prevented from conducting by the induction of an accelerating voltage in the secondary winding 20 or 22 of the associated feedback transformer due to the increase of collector curent in the associated primary winding 15 or 16. This accelerating voltage acts in a sense such as to increase the emitter potential of the now-conducting transistor, and to reduce that of the other transistor.

The greater the rate of rise of collector current the greater is the E.M.F. induced in the feedback secondary winding for further increasing the aforesaid emitter potential and the collector current. Hence once the flow of collector current has been initiated in either of the transistors the build-up of this current proceeds at a very high rate, and an output voltage is consequently induced in the output tertiary winding 19 or 21 of the associated feedback transformer, the presence of this output voltage indicating that the voltage signal applied to the base of the associated transistor is the greater of the two base circuit voltages.

This action will continue so long as there is still a sufficient collector current accelerating voltage present across the emitter and collector of the conducting transistor. With this in mind the voltage pulse applied to the primary winding 34 of the pulse transformer 25 is terminated before the collector current reaches its normal steady state value due to the potential applied between the terminals 27 and 28 i.e. before the accelerating voltage falls to zero value.

On the termination of the voltage pulse applied to the primary winding 34, the circuit returns to its former quiescent state in which current flows through the emitter load resistor 10 into the auxiliary circuit 23, and the transistors are non-conducting.

The two voltage signals to be compared at the terminals 30 and 31 should always be more positive than the potential applied to the terminal 29 of the auxiliary circuit 23, since otherwise in the absence of a voltage pulse in the auxiliary circuit currents will flow in the transistors 13 and 14 in preference to through the auxiliary circuit 23. Though in the above description the voltage signals for comparison at the terminals 30 and 31 have been negative in sense, they may be positive in sense (or one positive and the other negative in sense) provided that they lie within the range having as lower limit the negative potential applied to the terminal 29, and as upper limit the maximum potential of the cathode of the diode 26 when a voltage pulse is applied to the pulse transformer 25. Whatever the senses of the voltage signals the circuit will function in a manner such that the transistor having the more negative base potential will conduct to give rise to an output signal in the tertiary winding of its associated feedback transformer.

The above-described circuit arrangement is effective on application of a voltage pulse to the pulse transformer to indicate with a high degree of accuracy which of the two voltages applied to the base circuit terminals 30 and 31 is the greater, even when only small differences exist between these two voltages.

Transistors of the n-p-n types may be substituted for transistors 13 and 14 provided appropriate reversals of the potentials applied to the circuit are made.

Referring now to FIG. 2, the electrical apparatus there shown includes a voltage comparison means as described above with reference to FIG. 1, this comparison means being represented by a rectangle 35 on which are shown the output windings 19 and 21 of the feedback transformers 17 and 18, the primary winding 34 of the pulse transformer 25, and the base circuit terminals 30 and 31.

A bistable device 36 having "true" and "complement" output circuits 37 and 38 has a "set" input circuit 39 connected with the output winding of the transformer 17 and a "reset" input circuit 40 connected with the output winding 21 of the transformer 18. The bistable device 36 functions to produce a "true" output signal at the circuit 37 on energisation of its "set" circuit 39 by the transformer 17, and this "true" output signal persists until the "reset" circuit 40 is subsequently energised by the transformer 18. On energisation of the "reset" circuit 40 a "complement" output signal is produced at the circuit 38, and this "complement" output signal persists until the input "set" circuit is subsequently energised.

A voltage pulse producing means 41 whose output pulses are to be detected has an output circuit connected to the base circuit terminal 30. In the absence of such an output pulse the terminal 30 is maintained by the pulse producing means at a potential equal to the zero potential tapping of the aforesaid supply source of the voltage comparison means 35, whereas on production of such an output pulse the base circuit terminal 30 is driven temporarily negatively relative to the said zero potential tapping.

A pulse generator 42 is arranged to apply voltage pulses at a predetermined repetition rate to the primary winding 34 of the pulse transformer 25 in the sense required for causing the comparison means 35 to function in the manner already described above. The pulse generator is controlled in synchronism with the pulse producing means 41 in a manner such that the pulses of the generator are delayed by a few milli-micro-seconds relative to the instants at which the pulse producing means 41 may produce output pulses.

The base circuit terminal 31 of the voltage comparison means is connected to a suitable negative potential tapping of a battery which constitutes the aforesaid supply source for the voltage comparison means 35, the magnitude of this negative potential being approximately half of the magnitude of the pulses to be detected at the base circuit terminal 30.

The apparatus functions as will be readily appreciated to detect, each time the pulse generator 42 produces an output pulse, which of the two transistors 13 or 14 of the voltage comparison means has the greater negative base potential. If no voltage pulse is present at the base circuit terminal 30 when the pulse generator supplies a pulse to the transformer 25, the transistor 14 conducts and an output signal is applied to the "reset" circuit 40 of the bistable device 36, thus causing an output signal to be produced or maintained (as the case may be) at the "complement" output circuit 38.

On the other hand if a voltage pulse is present at the base circuit terminal 30 when the generator 42 produces a pulse, the transistor 13 conducts so as to cause an output signal to be applied to the "set" circuit 39 of the bistable device 36, thus causing an output signal to be produced or maintained (as the case may be) at the "true" output circuit 37.

This apparatus thus produces a "true" output signal so long as voltage pulses continue to be applied to the base circuit terminal 30, and a "complement" output signal whenever no voltage pulse is present at the terminal 30.

The apparatus described above with reference to FIG. 2 may be used for reading out the contents of a ferrite core storage device, the pulse signal producing means 41 in such a case being constituted by a read-out circuit of the storage device.

When reading out a "zero" from the storage device no pulse is produced in the read-out circuit so that on applying a pulse to the pulse transformer 25 an output signal is applied to the "reset" circuit 40 of the bistable device 36, the latter thereupon producing or maintaining an output signal at the complement output circuit 38. On the other hand, when reading-out a "unit" from the storage device a pulse is produced in the read-out circuit, so that a "set" signal is applied to the bistable device, and the latter thereupon produces or maintains a "true" output signal at the output circuit 37.

In this read-out apparatus the pulse generator 42 is caused to delay its pulses relative to those of the read-out circuit by a time interval sufficient to cause the comparison means 35 to function at an instant when each read-out pulse has risen substantially to its peak value. This is enabled by the very short time taken by the voltage comparison means to compare the two base potentials and to produce an output signal at either of its windings 19 or 21 each time a pulse is applied to the pulse transformer 25; because of this very rapid action the comparison of the base voltages is in fact made at a very precise instant in time. There is thus no need for the generator pulses to fall wholly within the read-out pulses; the width of the generator pulses is not important. This permits wider generator pulses to be used than are at the present used in other read-out circuits.

In FIG. 3 the voltage pulse produced by the read-out circuit 41 is shown by the full line A and the corresponding generator pulse is shown by the dotted line B. The comparison means 35 functions to compare the instantaneous value of the read-out pulse with that of the comparison voltage applied to the terminal 31, and it will be seen that the instant at which the generator pulse, and hence the instant at which the voltage comparison is made, is initiated may be varied within fairly wide limits without appreciably decreasing the value of the read-out voltage applied to the terminal 30 at the instant of comparison.

Where the read-out circuit 41 is such as to produce read-out pulses of either polarity the voltage comparison means 35 may be modified as shown in FIG. 5 to accept such read-out pulses by connecting a third branch circuit 60 in parallel with the two aforesaid branch circuits 11 and 12. This third branch circuit includes a transistor 61 and a feedback transformer 62 similar to those included in each of the branch circuits 11 and 12 and arranged to function in a similar manner. This third feedback transformer 62 has an output winding 63 which is connected with an input circuit 64 of an OR gate 65, another input circuit 66 of the gate being connected with the output winding 19 of the feedback transformer 17, and the output circuit 67 of the gate is connected with the "set" circuit of the bistable device 36.

The transistor 61 of this third branch circuit has a base control circuit 68 which responds to the voltage pulses applied to the base circuit terminal 30, and which in response to a voltage pulse of negative polarity (such as will cause transistor 13 to conduct and produce an output signal at the winding 19) causes the base of this third transistor to be driven to a positive value such as to maintain this third transistor 61 non-conducting. On the other hand when a voltage pulse of the opposite polarity is applied to the terminal 30 the base of transistor 13 is driven positively relative to its emitter so that this transistor 13 is maintained non-conducting, and the base of the third transistor 61 is driven negatively relative to its emitter thereby causing current to flow in the collector circuit 69 of this transistor, and consequently giving rise to the production of an output signal in the output winding 63 of the third feedback transformer 62.

As a further alternative this modified read-out apparatus may be arranged as shown in FIG. 6 to have the said third transistor 61 connected in parallel with the transistor 13, the third transistor functioning in the way just described above to give rise to a current in the feedback transformer 17 and not in a separate third feedback transformer.

Noise pulses occurring during intervals between the pulses applied to the pulse transformer cannot give rise to false operation of the apparatus provided that they do not exceed the negative potential applied to the auxiliary circuit terminal 29.

Referring now to FIG. 4 an apparatus for determining the magnitude of the saturation current gain of a transistor includes a voltage comparison means as described with reference to FIG. 1 which is represented by a rectangle 43 on which are shown the output windings 19 and 21 of the feedback transformers 17 and 18, the input winding 34 of the pulse transformer 25 and the base circuit terminals 30 and 31. The output windings 19 and 21 are connected to "set" and "reset" input circuits 44 and 45 of a bistable device 46 which has "true" and "complement" output circuits 47 and 48 for energising indicating lamps 49 and 50 respectively.

A transistor 51 whose saturation current gain is to be checked or determined is connected in a test circuit which includes a collector circuit 52 incorporating a load resistor 53 of adjustable value, and a base circuit 54 incorporating an adjustable resistor 55. The emitter of the test transistor 51 is connected to a zero potential tapping of the D.C. supply source associated with the voltage comparison means 43, the base circuit 54 is connected to a suitable negative potential tapping of this supply source, and the collector circuit 52 is connected to the output circuit of a pulse generator 56 which is arranged to provide negative voltage pulses at a predetermined repetition rate. The output pulses of the generator are also passed through an adjustable delay device 57 to the primary winding 34 of the pulse transformer 25, the delay device being readily adjustable for delaying by an adjustable amount the pulses applied to the pulse transformer 25 relative to the pulses as applied to the collector circuit 52. The delay device has a control range such as will give infinite variation of the instant at which any given pulse is to be applied to the pulse transformer 25 within the whole of the period during which the same pulse is to be applied to the collector circuit 52 of the test transistor.

The base circuit terminal 31 is connected to an adjustable source 58 of potential in a sense rendering the base of the transistor 14 negative relative to the zero potential tapping of the aforesaid D.C. supply source.

One way of testing a transistor to check that it conforms with its particular type specification will now be described. The current flowing in the base circuit 54 of the test transistor is first adjusted to a predetermined test value by adjustment of the resistor 55, and the magnitude of the square current pulses delivered by the pulse generator 56 to the collector circuit 52 of the test transistor is adjusted by means of the adjustable resistor 53 to a predetermined test value corresponding to the selected test value of base circuit current. The negative reference potential applied to the terminal 31 of the voltage comparison means 43 is then set by adjustment of the source 58 to a negative value equal to the maximum acceptable value of collector potential for the particular test conditions selected.

To then check the behaviour of the test transistor under these test conditions an adjustment member of the delay device 57 is operated to progressively delay the voltage pulses applied to the pulse transformer 25 of the voltage comparison means relative to the current pulses in the collector circuit 52, the delay being increased gradually so as to compare the collector potential of the test transistor 51 with the reference voltage applied to the terminal 31 at successively later instants in successively later groups of collector current pulses.

If the test transistor 51 has a saturation current gain which is greater than a predetermined value to be expected in accordance with the transistor type specification, the collector potential does not become more negative than the reference potential applied to the terminal 31 throughout the whole of each collector current pulse, so that the indicating lamp 50 remains illuminated. On the other hand, if the saturation current gain is less than the predetermined expected value the collector-emitter potential rises above the saturation value during each collector current pulse, so that as the variable delay device 57 is adjusted to increase the delay the collector potential of the test transistor will at some instant of comparison fall below the reference voltage and the lamp 49 will be illuminated in place of the lamp 50.

The actual value of the saturation current gain may then be found by adjusting the value of the current in the base circuit 54 and noting the minimum value at which the collector potential of the test transistor does not fall below the reference potential appearing at the terminal 31 at any time during a collector circuit current pulse.

The method of testing just described is particularly useful in checking transistors before installing them in a piece of apparatus so as to ensure that they conform to a certain minimum standard.

What I claim as my invention and desire to secure by Letters Patent is:

1. An electric voltage comparison means including two similar transistors having their emitter-collector circuits connected in parallel with one another and sharing a common emitter circuit load resistor, each transistor having associated therewith a positive feedback means for feeding back energy from its collector circuit to its emitter circuit in a sense tending to accelerate any change in its collector current, and each of the two feedback means having an output circuit for providing an output signal when the collector circuit current of the associated transistor changes in value, input circuit means for applying two D.C. voltage signals for comparison to the base-emitter circuits respectively of the transistors, and an auxiliary circuit for connecting the junction of the common emitter load resistor and the two emitter circuits of the transistors with a source of bias potential and including a voltage pulse producing means for momentarily varying the potential of this junction in a step-like manner whereby to cause the transistor having a base potential nearer the bias potential of the bias source to change rapidly between its non-conductive and conductive states when energized from an appropriate D.C. voltage supply source.

2. An electric voltage comparison means according to claim 1, including a third similar transistor having its emitter and collector electrodes electrically connected directly to the emitter and collector electrodes respectively of one of the two transistors, and means for applying to the base-emitter circuit of the third transistor an electric voltage signal varying in dependence upon, and in the opposite sense to, the voltage signal applied to the base-emitter circuit of the said one of the two transistors.

3. An electric voltage comparison means according to claim 1, including a third similar transistor having its emitter-collector circuit connected in parallel with the parallel-connected emitter-collector circuits of the two transistors, a third positive feedback means associated with the third transistor for feeding back energy from its collector circuit to its emitter circuit in a sense tending to accelerate any change in the collector circuit current of the third transistor, the third feedback means having an output circuit for supplying an output signal when the collector circuit current of the third transistor changes in value, and an OR gating means responsive to the output signals of the feedback means associated with the third transistor and one of the two transistors respectively, and means for applying to the base-emitter circuit of the third transistor an electric voltage signal varying in dependence upon, and in the opposite sense to, the voltage signal applied to the base-emitter circuit of the said one of the two transistors.

4. Means for detecting the presence or absence of an input voltage pulse in an input train of pulses comprising an electric voltage comparison means according to claim 1, a bistable electric device for producing true and complement output signals in response to appropriate signals applied to set and reset input circuits respectively by the respective output circuits of the feedback means, means for applying the input voltage pulse train to the base-emitter circuit of one of the said two transistors, means for biasing the base-emitter circuit of the other of the two transistors to a potential of magnitude less than that of the said input voltage pulses, and means responsive to the said input pulse train for causing the said voltage pulse producing means to induce pulses in the auxiliary circuit which are delayed by a predetermined amount relative to the said input pulses.

5. Means for detecting the presence or absence of an input voltage pulse in an input train of pulses comprising an electric voltage comparison means according to claim 2, a bistable electric device for producing true and complement output signals in response to appropriate signals applied to set and reset input circuits respectively by the respective output circuits of the feedback means, means for applying the input voltage pulse train to the base-emitter circuit of the said one of the two transistors, means for biasing the base-emitter circuit of the other of the two transistors to a potential of magnitude less than that of the said input voltage pulses, and means responsive to the said input pulse train for causing the said voltage pulse producing means to induce pulses in the auxiliary circuit which are delayed by a predetermined amount relative to the said input pulses.

6. Means for detecting the presence or absence of an input voltage pulse in an input train of pulses comprising an electric voltage comparison means according to claim 3, a bistable electric device for producing true and complement output signals in response to appropriate signals applied to set and reset input circuits respectively by the OR gating means and by the output circuit respectively of the feedback means associated with the other of the two transistors, means for applying the input voltage pulse train to the base-emitter circuit of the said one of the two transistors, means for biasing the base-emitter circuit of the other of the two transistors to a potential of magnitude less than that of the said input voltage pulses, and means responsive to the said input pulse train for causing the said voltage pulse producing means to induce pulses in the auxiliary circuit which are delayed by a predetermined amount relative to the said input pulses.

7. Means for checking the electrical performance of transistors comprising electric voltage comparison means according to claim 1, a bistable electric device for producing true and complement output signals in response to appropriate signals applied to set and reset input circuits respectively by the respective output circuits of the two feedback means, a second pulse generating means for causing current pulses to flow in the emitter-collector circuit of a transistor under test, adjustable means for controlling the flow of base current in the transistor under test, means for applying the emitter-collector potential difference of the transistor under test to the base-emitter circuit of one of the two transistors, adjustable bias means for providing an adjustable base-emitter potential for the other of the two transistors, and an adjustable delay means responsive to the output pulses of the second pulse generating means for causing the first-mentioned voltage pulse producing means to induce pulses in the auxiliary circuit which are delayed by an adjustable amount relative to the input voltage pulses applied to the emitter-collector circuit of the transistor under test.

8. Means according to claim 1, wherein each feedback means comprises a transformer having a primary winding connected in the collector circuit of the associated transistor, a secondary winding connected in the emitter circuit of the associated transistor, and a tertiary winding constituting the said output circuit for providing an output signal when the collector circuit current of the associated transistor changes in value.

9. Means according to claim 1, including diode means for connecting the collector electrodes of the transistors with appropriate potential tappings of a D.C. supply source whereby to limit the change in potential of the collector electrodes of the transistors due to any change in collector current.

10. Means according to claim 1, wherein the auxiliary circuit includes a diode connected in series with the voltage pulse producing means in such a manner as to limit the change in potential of the said junction in response to a voltage pulse produced by the voltage pulse producing means.

11. Means according to claim 4, in combination with a read-out circuit of a ferrite core store for providing the said input voltage pulse train.

12. Means according to claim 4, wherein each feedback means comprises a transformer having a primary winding connected in the collector circuit of the associated transistor, a secondary winding connected in the emitter circuit of the associated transistor, and a tertiary winding constituting the said output circuit for providing an output signal when the collector circuit current of the associated transistor changes in value.

13. Means according to claim 5, in combination with a read-out circuit of a ferrite core store for providing the said input voltage pulse train.

14. Means according to claim 5, wherein each feedback means comprises a transformer having a primary winding connected in the collector circuit of the associated connected, a secondary winding connected in the emitter circuit of the associated transistor, and a tertiary winding constituting the said output circuit for providing an output signal when the collector circuit current of the associated transistor changes in value.

15. Means according to claim 6, in combination with a read-out circuit of a ferrite core store for providing the said input voltage pulse train.

16. Means according to claim 6, wherein each feedback means comprises a transformer having a primary winding connected in the collector circuit of the associated transistor, a secondary winding connected in the emitter circuit of the associated transistor, and a tertiary winding constituting the said output circuit for providing an output signal when the collector circuit current of the associated transistor changes in value.

17. Means according to claim 12, including diode means for connecting the collector electrodes of the transistors with appropriate potential tappings of a D.C. supply source whereby to limit the change in potential of the collector electrodes of the transistors due to any change in collector current.

18. Means according to claim 14, including diode means for connecting the collector electrodes of the transistors with appropriate potential tappings of a D.C. supply source whereby to limit the change in potential of the collector electrodes of the transistors due to any change in collector current.

19. Means according to claim 16, including diode means for connecting the collector electrodes of the transistors with appropriate potential tappings of a D.C. supply source whereby to limit the change in potential of the collector electrodes of the transistors due to any change in collector current.

20. Means according to claim 17, wherein the auxiliary circuit includes a diode connected in series with the voltage pulse producing means in such a manner as to limit the change in potential of the said junction in response to a voltage pulse produced by the voltage pulse producing means.

21. Means according to claim 18, wherein the auxiliary circuit includes a diode connected in series with the voltage pulse producing means in such a manner as to limit the change in potential of the said junction in response to a voltage pulse produced by the voltage pulse producing means.

22. Means according to claim 19, wherein the auxiliary circuit includes a diode connected in series with the voltage pulse producing means in such a manner as to limit the change in potential of the said junction in response to a voltage pulse produced by the voltage pulse producing means.

No references cited.

JOHN W. HUCKERT, *Primary Examiner.*

ARTHUR GAUSS, *Examiner.*